United States Patent
Wang et al.

(10) Patent No.: US 10,442,712 B2
(45) Date of Patent: Oct. 15, 2019

(54) MEMBRANE BIOREACTOR FOR STRENGTHENING MEMBRANE FOULING CONTROL AND METHOD THEREOF

(71) Applicants: Nanjing University, Nanjing (CN); Nanjing University & Yancheng Academy of Environmental Protection Technology and Engineering, Yancheng (CN)

(72) Inventors: Jinnan Wang, Nanjing (CN); Chao Qi, Nanjing (CN); Yaohua Lin, Nanjing (CN)

(73) Assignee: Nanjing University, Nanjing University & Yancheng Academy of Environmental Protection Technology and Engineering, Nanjing (CN)

( * ) Notice: Subject to any disclaimer, the term of this patent is extended or adjusted under 35 U.S.C. 154(b) by 27 days.

(21) Appl. No.: 15/632,211

(22) Filed: Jun. 23, 2017

(65) Prior Publication Data
US 2018/0370828 A1   Dec. 27, 2018

(51) Int. Cl.
*C02F 1/44* (2006.01)
*C02F 3/00* (2006.01)
(Continued)

(52) U.S. Cl.
CPC ............ *C02F 3/1268* (2013.01); *B01D 65/02* (2013.01); *C02F 1/44* (2013.01); *C02F 1/52* (2013.01);
(Continued)

(58) Field of Classification Search
CPC ................ C02F 3/1273; C02F 2303/16; C02F 2303/20; B01D 2315/06; B01D 2315/04;
(Continued)

(56) References Cited

U.S. PATENT DOCUMENTS 3,355,022 A * 11/1967 Nordell .............. B01D 29/6484
                                                     210/162
5,192,456 A *  3/1993 Ishida .................... B01D 61/14
                                                     210/195.2
(Continued)

FOREIGN PATENT DOCUMENTS

JP           09057071    *  3/1997
JP        WO2015114812   *  8/2015

OTHER PUBLICATIONS

English language machine translation of JP09057071, 14 pages, No Date.*

*Primary Examiner* — Pranav N Patel
(74) *Attorney, Agent, or Firm* — Zhihua Han

(57) ABSTRACT

Embodiments herein relate to a membrane bioreactor for strengthening membrane fouling control and method thereof. The embodiments may solve problems associated with existing techniques in the field of water treatment. The membrane bioreactor may include a reactor wall, a membrane element, a collecting pipe, a water collecting pipe, a vacuum table, a suction pump, a cleaning unit, an air compressor, an aeration pipe, an aeration head, an inlet pipe, and a drain pipe. The existing techniques related to membrane fouling control has problems such as complexity to operate, difficulties to clean online, and uses of chemicals, which may cause secondary pollution. The embodiments relate to a device that includes a set of automatic mechanical transmission units. With cleaning parts installed at terminals of the device, the surface of the pollution layer of the flat membrane may be cleaned periodically to achieve in situ membrane fouling control, an increase of water production capacity and backwash cycle, and improvement of the efficiency of the membrane bioreactor.

7 Claims, 4 Drawing Sheets

(51) Int. Cl.
*C02F 3/20* (2006.01)
*C02F 3/12* (2006.01)
*C02F 1/52* (2006.01)
*B01D 65/02* (2006.01)
*C02F 1/00* (2006.01)
*B01D 61/14* (2006.01)

(52) U.S. Cl.
CPC ............ *C02F 3/1273* (2013.01); *C02F 3/208* (2013.01); *B01D 61/14* (2013.01); *B01D 2313/48* (2013.01); *B01D 2315/08* (2013.01); *B01D 2315/20* (2013.01); *C02F 1/00* (2013.01); *C02F 3/00* (2013.01); *C02F 3/006* (2013.01); *C02F 2209/005* (2013.01); *C02F 2209/44* (2013.01); *C02F 2303/16* (2013.01); *C02F 2303/20* (2013.01)

(58) Field of Classification Search
CPC .... B01D 2315/05; B01D 65/08; B01D 65/02; B01D 63/16; B01D 63/08; B01D 63/082; B01D 25/38; B01D 2321/30; B01D 2321/2091; B01D 29/684; B01D 29/686; B01D 29/6423; B01D 29/643; B01D 29/6453; B01D 29/6461; B01D 29/6484; B01D 29/6492; B01D 29/688; B01D 46/0065; B01D 46/0071
See application file for complete search history.

(56) References Cited

U.S. PATENT DOCUMENTS

| | | | |
|---|---|---|---|
| 2015/0306544 A1* | 10/2015 | Park ................... | B01D 65/02 210/636 |
| 2016/0059156 A1* | 3/2016 | Dannemann ......... | B01D 29/684 210/791 |
| 2017/0151512 A1* | 6/2017 | Takahashi ............. | B01D 29/52 |

\* cited by examiner

MEMBRANE BIOREACTOR FOR STRENGTHENING MEMBRANE FOULING CONTROL AND METHOD THEREOF

BACKGROUND

Membrane bioreactor (MBR) technology is new sewage treatment technology that combines the membrane technology and biological treatment technology. Membrane components of MBR replace traditional secondary sedimentation tanks to perform effective analysis and interception of mixtures after biological treatment and to achieve mud separation. Membrane bioreactors have advantages such as small footprint, effective treatment effect, and less residual sludge. However, at the same time, there are difficulties associated with MBR such as film pollution control, membrane module cleaning, and other issues. Conventional membrane fouling control methods include the membrane module for backwashing under appropriate operating conditions such as using chemicals cleaning methods. These traditional methods cause large energy consumption, loss of membrane components, needs of membrane components cleaning after removal of membrane elements, secondary pollution, and other issues.

SUMMARY

The present disclosure belongs to the technical field of sewage treatment, relates to a membrane bioreactor for strengthening membrane fouling control and method thereof, and more particularly relates to a membrane bioreactor capable of in situ membrane fouling control of the pollution layer on the surface of the flat membrane and an operation method thereof.

1. Technical Problems Solved by Embodiments

Existing techniques related to membrane fouling control have problems such as complexity to operate, difficulties to clean online, uses of chemicals, which may cause secondary pollution. Embodiments herein relate to a membrane bioreactor for strengthening membrane fouling control and method thereof. The embodiments may solve the problems discussed above.

The embodiments further relate to a device that includes a set of automatic mechanical transmission units. With cleaning parts installed at terminals of the device, the surface of the pollution layer of the flat membrane may be cleaned periodically to achieve in situ membrane fouling control, an increase of water production capacity and backwash cycle, and improvement of the efficiency of the membrane bioreactor.

2. Technical Solutions

The embodiments utilize a cleaning part mounted at terminals or ends of a mechanical transmission device to perform in situ cleaning of a flat membrane in the membrane bioreactor. A cleaning head installed on the cleaning part can effectively remove the pollution layer cumulated on the membrane surface due to long-term operations to reduce the transmembrane pressure of the membrane bioreactor and to increase membrane flux associated with the membrane bioreactor.

The membrane bioreactor for strengthening membrane fouling control may include a reactor wall, a membrane element, a collecting pipe, a water collecting pipe, a vacuum table, a suction pump, a cleaning unit, an air compressor, an aeration pipe, an aeration head, an inlet pipe and a drain pipe. The cleaning unit may include a stainless steel frame, a stainless steel crane, a drive shaft, an electric motor, a programmable logic controller, a stainless steel connecting pipe, a universal joint, a cleaning part, and an air compressor. The bottom of the stainless steel frame is connected to the upper part of the reactor wall. The upper end of the stainless steel crane is fixed to the top end of the stainless steel frame, and the lower end of the stainless steel crane is connected to the transmission shaft in the form of an annulus. One end of the transmission shaft is connected to the electronic motor, and the other end of the transmission shaft is fixed to the stainless steel frame and is capable of rotating freely around an axis. The electronic motor is connected to a programmable logic controller. The upper end of the stainless steel connecting pipe is connected to the top end of a protrusion portion of the transmission shaft, and the lower end of the stainless steel connecting pipe is connected to the cleaning part through the universal joint.

The membrane element, the collecting pipe, the water collecting pipe, the vacuum table and the suction pump are connected in turn to each other and placed in the inside of the membrane bioreactor. The cleaning member is in the middle of the two membrane elements. The aeration pipe, the aeration head, and the drain pipe are located at the bottom of the reactor wall. The air compressor is connected to the aeration pipe, the aeration head is provided on the aeration pipe, and the inlet pipe is in the upper part of the reactor wall.

The transmission shaft is a solid tube of stainless steel material, and a main body shape of the transmission shaft has an alternating convex and concave structure.

The universal joint comprises a pair of stainless steel hinges having a relative orientation of 90°.

The cleaning part is in a shape of a substantially rectangular part and includes an upper and lower cleaning member frames and a cleaning head. The cleaning head is mounted in the middle of both sides of the cleaning member frames via a fixing bolt, and the cleaning head protrudes from the outer edge of a cleaning member frame by 1-1.5 cm. The cleaning head is made of a PVA rubber, a PU rubber, or absorbent fibrous gauze.

The cleaning unit may include two sets, and the two electronic motors are turned on at the same time to drive two transmission shafts to rotate around the axis with opposite rotation directions when the cleaning unit is running.

The embodiments relate to an operating method for strengthening membrane fouling control of a membrane bioreactor. The method strengthens the membrane fouling control for the operation of membrane bioreactor, wherein a programmable logic controller (plc) controls the operation of two cleaning units above the membrane bioreactor. When the cleaning unit is running, the two electronic motors are turned on at the same time to drive two transmission shafts to rotate around the axis with opposite rotation directions. The rotation of the protrusion portion of the transmission shaft drives up and down movement of the stainless steel connection pipe. Two stainless steel connection pipes, through the connection of the universal joint, ensure upper and lower movement of the cleaning part between two membrane elements. Cleaning heads mounted on both sides of the cleaning part erase the pollution layer on the surface of the membrane element during repeated up and down movement. The pollution layer remaining on the cleaning head is removed by an aeration scouring process, and the programmable logic controller is set to a switch alternate mode.

3. Beneficial Effects

The technical solutions provided by the present disclosure, as compared with the prior art, have the following beneficial effects.

(1) The start-stop process of the cleaning unit is controlled by the programmable logic controller and adjusts cleaning cycle and a single cleaning time according to pollution conditions, which is easy to operate, saves energy and protects the environment.

(2) In situ cleaning on the pollution layer on the surface of the flat membrane may be carried out by a cleaning head of the cleaning unit. Cleaning efficiency is high, and the embodiments avoid the decline in processing due to downtime capacity of traditional membrane bioreactors during the cleaning process.

(3) The cleaning head is made of flexible material. Thus, its surface has no negative effect on the membrane structure during wiping process, and the design increases the life of the membrane material.

(4) The cleaning head for cleaning the membrane surface and the adhesion of pollutants does not need to be taken out for ectopic treatment. The pollutants may be gradually washed away from the cleaning head by aeration to achieve the clean head in situ regeneration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The accompanying drawings and the embodiments of the present disclosure will be described in detail.

Example 1

Figure 1:
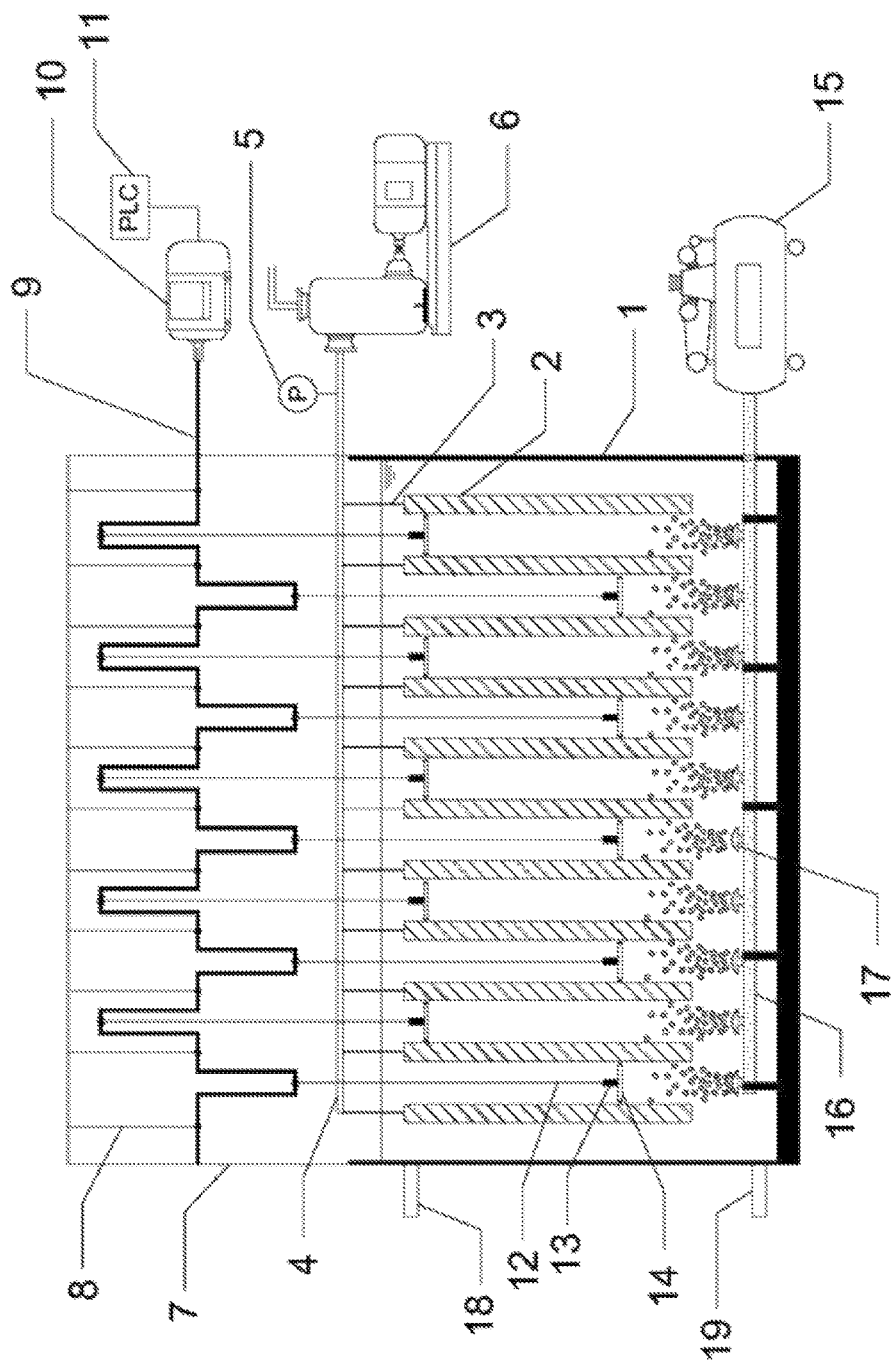
FIG. 1 is a schematic view of a membrane bioreactor for strengthening membrane fouling control in accordance with the present disclosure (1 refers to reactor wall; 2 refers to membrane element; 3 refers to collection pipe; 4 refers to water collecting pipe; 5 refers to vacuum table; 6 refers to suction pump; 7 refers to Stainless steel frame; 8 refers to stainless steel crane; 9 refers to transmission shaft; 10 refers to electronic motor; 11 refers to programmable logic controller; 12 refers to stainless steel connecting pipe; 13 refers to universal joint; 14 refers to cleaning unit; 15 refers to air compressor; 16 refers to aeration pipe; 17 refers to aeration head; 18 refers to inlet pipe; and 19 refers to drain pipe).

As shown in FIG. 1, the membrane bioreactor for strengthening membrane fouling control may include a reactor wall 1, a membrane element 2, a collecting pipe 3, a water collecting pipe 4, a vacuum table 5, a suction pump 6, a cleaning unit, an air compressor 15, an aeration pipe 16, an aeration head 17, an inlet pipe 18, and a drain pipe 19. The cleaning unit may include a stainless steel frame 7, a stainless steel crane 8, a transmission shaft 9, an electronic motor 10, a programmable logic controller 11, a stainless steel connecting pipe 12, a universal joint 13, a cleaning part 14, and an air compressor 15, wherein the bottom of the stainless steel frame 7 is connected to the upper part of the reactor wall 1. The upper end of the stainless steel crane 8 is fixed to the top end of the stainless steel frame 7, and the lower end of the stainless steel crane 8 is connected to the transmission shaft 9 in the form of an annulus. One end of the transmission shaft 9 is connected to the electronic motor 10, and the other end of the transmission shaft 9 is fixed to the stainless steel frame 7 and is capable of rotating freely around an axis. The electronic motor 10 is connected to a programmable logic controller 11. The upper end of the stainless steel connecting pipe 12 is connected to the top end of a protrusion portion of the transmission shaft 9, and the lower end of the stainless steel connecting pipe 12 is connected to the cleaning part 14 through the universal joint 13.

The membrane element 2, the collecting pipe 3, the water collecting pipe 4, the vacuum table 5 and the suction pump 6 are connected in turn to each other and placed in the inside of the membrane bioreactor. The cleaning part 14 is in the middle of the two membrane elements 2. The aeration pipe 16, the aeration head 17 and the drain pipe 19 are located at the bottom of the reactor wall 1, and the air compressor 15 is connected to the aeration pipe 16. The aeration head 17 is provided on the aeration pipe 16, and the inlet pipe 18 is in the upper part of the reactor wall 1.

The transmission shaft 9 is a solid tube of stainless steel material, and a main body shape of the transmission shaft has an alternating convex and concave structure. The protrusion portion of the transmission shaft 9 is connected to the upper end of the stainless steel connection pipe 12 through the stainless steel ring 23, and rotation of the transmission shaft 9 drives up and down movement of the stainless steel connection pipe 12.

The universal joint 13 may include a pair of stainless steel hinges having a relative orientation of 90°.

Figure 2:
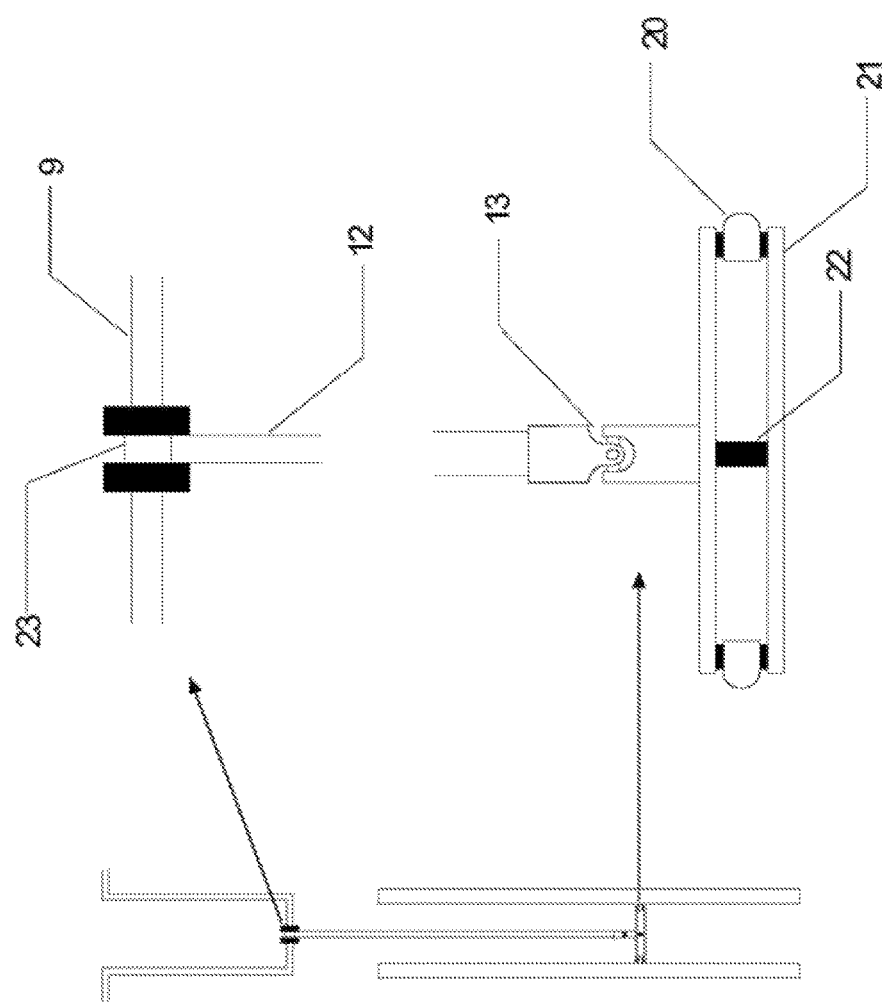
FIG. 2 is a schematic view of the structure of a single set of a cleaning unit in accordance with the present disclosure (9 refers to transmission shaft; 12 refers to stainless steel connecting pipe; 13 refers to universal joint; 20 refers to cleaning head; 21 refers to skeleton of cleaning unit; 22 refers to fixing bolt; and 23 refers to stainless steel ring).
Figure 3:
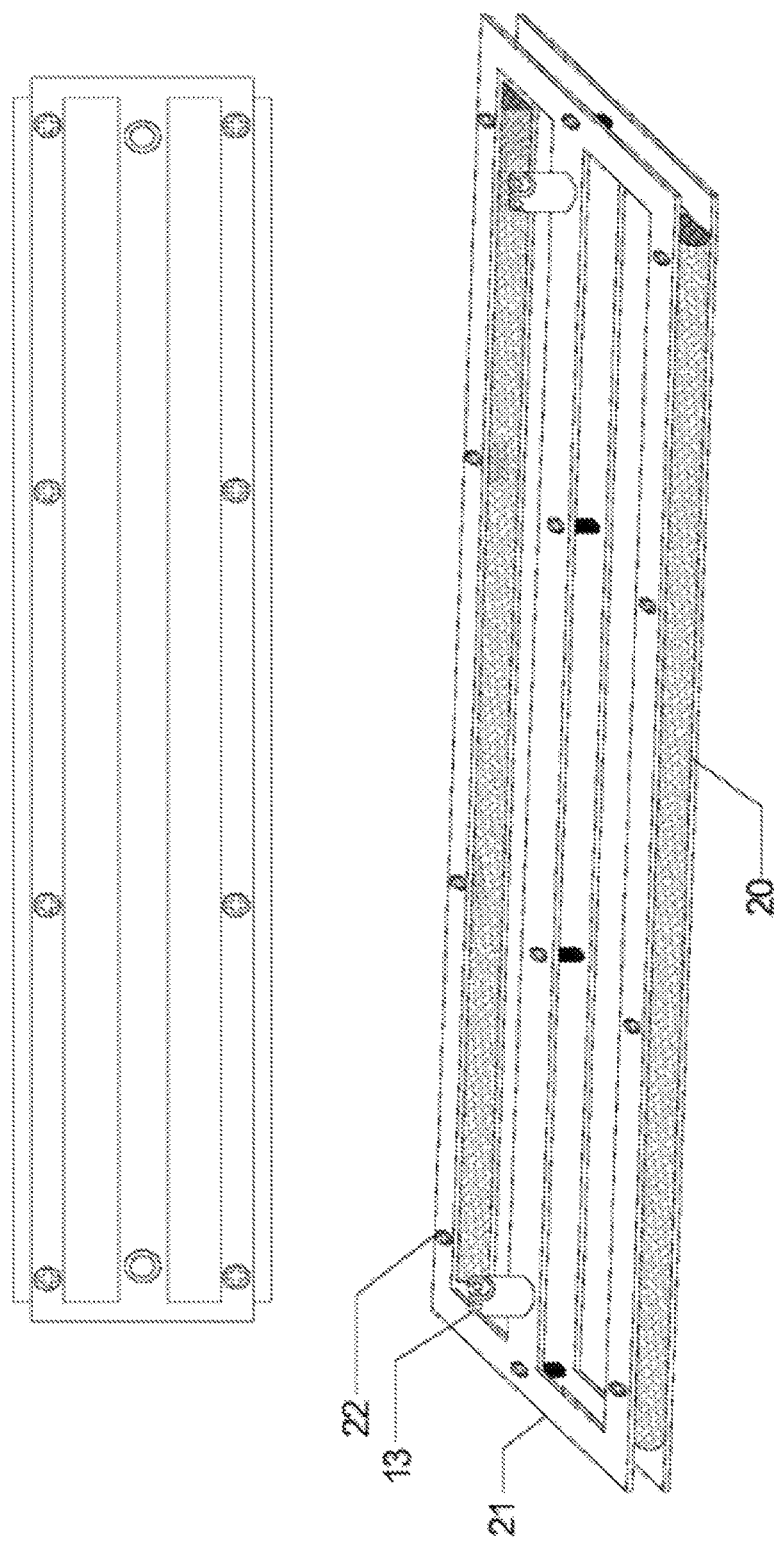
FIG. 3 is a schematic view of the structure of the cleaning part in accordance with the present disclosure (13 refers to universal joint; 20 refers to cleaning head; 21 refers to skeleton of cleaning unit; and 22 refers to fixing bolts).

As shown in FIG. 2 and FIG. 3, the cleaning part 14 is in a shape of a substantially rectangular part and two superimposed cubes and may include an upper and lower cleaning member frames 21 and a cleaning head 20. The cleaning head 20 is mounted in the middle of both sides of the cleaning member frames 21 via a fixing bolt 22, and the cleaning head 20 protrudes from the outer edge of a cleaning member frame 21 by 1-1.5 cm. The cleaning head 20 is made of PVA glue.

The cleaning unit may include two sets, and the two electronic motors 10 are turned on at the same time to drive two transmission shafts 9 to rotate around the axis with opposite rotation directions when the cleaning unit is running.

Figure 4:
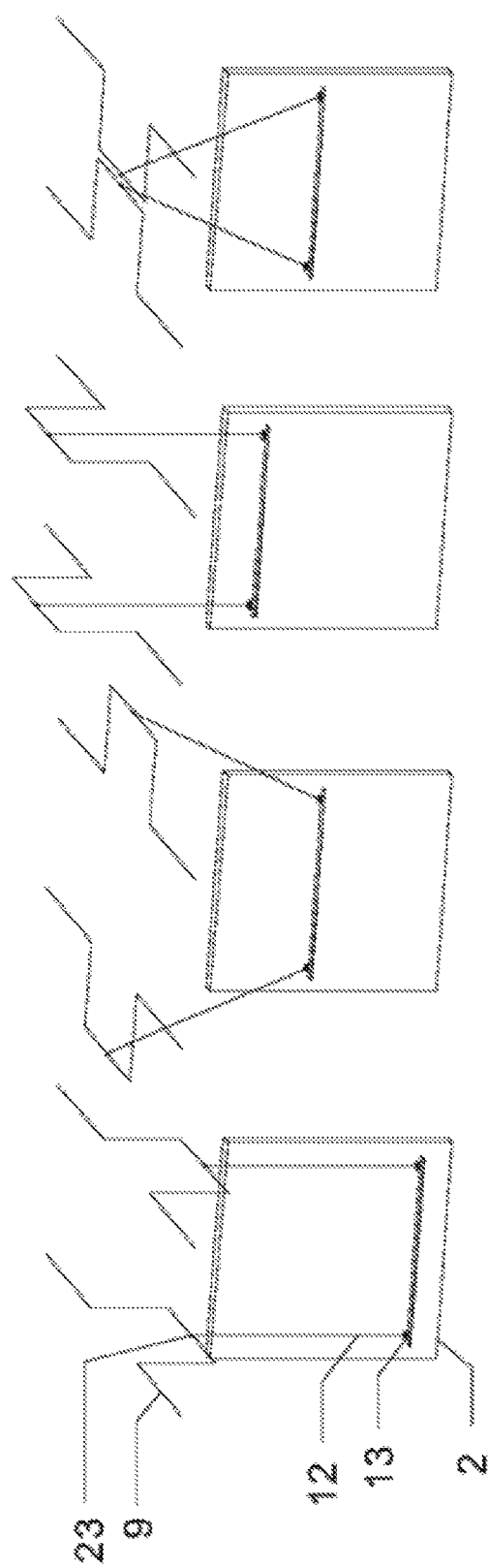
FIG. 4 is a schematic view of the operation of the cleaning unit in accordance with the present disclosure (2 refers to membrane element; 9 refers to transmission shaft; 12 refers to stainless steel connecting pipe; 13 refers to universal joint; and 23 refers to stainless steel ring).

As shown in FIG. 4, the embodiments relate to an operating method for strengthening membrane fouling control of a membrane bioreactor. In some embodiments, the programmable logic controller 11 is set to "8 minutes—ON; 2 minutes—off": 10 minutes for a work cycle pattern. When the programmable logic controller 11 is in the "on" state, the two sets of cleaning units above the membrane bioreactor start running at the same time. The two electronic motors 10 are simultaneously turned on to drive two transmission shafts 9 to rotate around the axis with opposite rotation directions. Rotation cycle is 30 seconds/turn. The rotation of the protrusion portion of the transmission shaft 9 drives up and down movement of the stainless steel connection pipe 12. Two stainless steel connection pipes 12, through the connection of the universal joint 13, may ensure upper and lower movement of the cleaning part 14 between two membrane elements 2. The transmission shaft 9 rotates once, and the cleaning part 14 move up and down once. Cleaning heads 20 mounted on both sides of the cleaning part 14 may erase a pollution layer on the surface of the membrane element 2 during repeated up and down movement, slowing the effect of membrane fouling on the water production capacity of the membrane bioreactor. The pollution layer remaining on the cleaning head 20 may be removed by an aeration scouring process.

Example 2

The membrane bioreactor for strengthening membrane fouling control of Example 2 is the same as Example 1. The difference is that in Example 2, the cleaning head 20 is made of PU glue.

Example 3

The membrane bioreactor for strengthening membrane fouling control of Example 3 is the same as Example 1. The difference is that in Example 3, the cleaning head 20 is made of absorbent fibrous gauze.

CONCLUSION

Although the subject matter has been described in language specifically to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A membrane bioreactor for strengthening membrane fouling control, the membrane bioreactor comprising:
    a reactor wall, a plurality of membrane elements, a collecting pipe, a water collecting pipe, a vacuum table, a suction pump, a cleaning unit, an air compressor, an aeration pipe, an aeration head, an inlet pipe, and a drain pipe; and
    the cleaning unit comprising a stainless steel frame and two sets of the following: a stainless steel crane, a transmission shaft, an electric motor, a programmable logic controller, a stainless steel connecting pipe, a universal joint, and a cleaning part, wherein
    a bottom of the stainless steel frame is connected to an upper part of the reactor wall,
    upper ends of the stainless steel cranes are fixed to a top end of the stainless steel frame, lower ends of the stainless steel cranes are connected to the corresponding transmission shafts in the form of an annulus,
    one end of the transmission shafts are connected to the electric motors, the other ends of the transmission shafts are fixed to the stainless steel frame and wherein the transmission shafts are capable of rotating around an axis, and
    the electric motors are connected to the programmable logic controllers, the upper ends of the stainless steel connecting pipes are connected to top ends of protrusion portions of the transmission shafts, and lower ends of the stainless steel connecting pipes are connected to the cleaning parts through the universal joints;
    each set of the cleaning parts is in the middle of an in touch with two of the plurality of membrane elements, and wherein the electric motors are configured to be turned on at the same time to drive the transmission shafts to rotate around the axis with opposite rotation directions when the cleaning unit is running; wherein the protrusion portions of the transmission shafts are configured to drive up and down movement of the stainless steel connecting pipes when the transmission shafts are rotated; and
    wherein each of the stainless steel connecting pipes are configured to, through the connection of the universal joints, ensure upper and lower movement of the cleaning parts between two of the plurality of membrane elements; and
    two cleaning heads are mounted on two sides of the cleaning parts are configured to erase a pollution layer on a surface of the plurality of membrane elements.

2. The membrane bioreactor of claim 1, wherein the plurality of membrane elements, the collecting pipe, the water collecting pipe, the vacuum table and the suction pump are connected in turn to each other, the plurality of membrane elements, the collecting pipe, and the water collecting pipe are placed in the inside of the membrane bioreactor.

3. The membrane bioreactor of claim 1, wherein the aeration pipe, the aeration head and the drain pipe are located at the bottom of the reactor wall, the air compressor is connected to the aeration pipe, the aeration head is provided on the aeration pipe, and the inlet pipe is in the upper part of the reactor wall.

4. The membrane bioreactor of claim 1, wherein each of the transmission shafts is a solid tube of stainless steel material, and a main body shape of each of the transmission shafts has an alternating convex and concave structure.

5. The membrane bioreactor of claim 1, wherein each of the universal joints comprises a pair of stainless steel hinges having an orientation of 90° relative to each other.

6. The membrane bioreactor of claim 1, wherein each of the cleaning parts is in a shape a substantially rectangular plate and comprises an upper and lower cleaning member frames and a cleaning head, the cleaning head is mounted in the middle of both sides of the cleaning member frames via a fixing bolt, and the cleaning head protrudes from an outer edge of a cleaning member frame by 1-1.5 cm.

7. The membrane bioreactor of claim 6, wherein the cleaning head is made of a PVA rubber, a PU rubber or absorbent fibrous gauze.

* * * * *